United States Patent [19]

Shoup et al.

[11] Patent Number: 4,797,057
[45] Date of Patent: Jan. 10, 1989

[54] WHEEL-LIFT TOW TRUCK

[75] Inventors: Gary L. Shoup, Greencastle; Allen B. Coffman, Mercersberg, both of Pa.; Robert L. Fix, Hagerstown, Md.

[73] Assignee: Jerr-Dan Corporation, Greencastle, Pa.

[21] Appl. No.: 767,740

[22] Filed: Aug. 20, 1985

[51] Int. Cl.⁴ .................................................. B60P 3/12
[52] U.S. Cl. ................................... 414/563; 280/402; 414/917
[58] Field of Search ............... 414/563, 917, 426, 429, 414/546, 558; 280/402

[56] References Cited

U.S. PATENT DOCUMENTS

| | | | |
|---|---|---|---|
| 1,394,375 | 10/1921 | Torkildson | 254/1 |
| 2,183,473 | 12/1937 | Holmes et al. | 212/141 |
| 2,392,903 | 1/1946 | Currie | 280/33.44 |
| 2,438,571 | 3/1948 | Maxon Jr. | 280/6 |
| 2,545,584 | 3/1951 | Meadows | 280/33.05 |
| 2,715,470 | 8/1955 | Marcus et al. | 214/86 |
| 2,726,777 | 12/1955 | Wiley | 214/86 |
| 2,899,087 | 8/1959 | Jacobsen | 214/16.1 |
| 3,051,337 | 8/1962 | Nelson | 214/86 |
| 3,182,829 | 5/1965 | Wagner | 214/86 |
| 3,263,835 | 8/1966 | Lugash | 414/558 |
| 3,285,443 | 11/1966 | Gaumont | 214/86 |
| 3,434,607 | 3/1969 | Nelson | 214/86 |
| 3,620,393 | 11/1971 | Bubik | 214/86 A |
| 3,666,122 | 5/1972 | Youmans | 414/917 X |
| 3,690,482 | 9/1972 | Gaumont | 214/86 A |
| 3,700,123 | 10/1972 | Corley, Jr. | 414/917 X |
| 3,897,879 | 8/1975 | Bubik | 214/86 A |
| 3,908,842 | 9/1975 | Place | 214/86 A |
| 3,924,763 | 12/1975 | Pigeon | 214/86 A |
| 4,034,873 | 7/1977 | Haring | 214/86 A |
| 4,134,504 | 1/1979 | Salas et al. | 414/558 |
| 4,264,262 | 4/1981 | LoCodo | 414/563 |
| 4,274,791 | 6/1981 | Moon | 414/563 |
| 4,384,817 | 5/1983 | Peterson | 414/563 |
| 4,451,193 | 5/1984 | Cannon, Jr. et al. | 414/563 |
| 4,456,421 | 6/1984 | Robson | 414/917 X |
| 4,473,237 | 9/1984 | Lind | 280/402 |
| 4,473,334 | 9/1984 | Brown | 414/563 |
| 4,564,207 | 1/1986 | Russ et al. | 414/563 X |
| 4,573,857 | 3/1986 | Porter, Sr. et al. | 280/402 X |
| 4,674,943 | 6/1987 | Nespor | 414/563 |
| 4,678,392 | 7/1987 | Capers et al. | 414/563 |

FOREIGN PATENT DOCUMENTS

| | | | |
|---|---|---|---|
| 2829298 | 1/1980 | Fed. Rep. of Germany . | |
| 260422 | 11/1926 | United Kingdom | 414/563 |
| 687492 | 2/1953 | United Kingdom | 414/563 |
| 760688 | 11/1956 | United Kingdom | 414/563 |

OTHER PUBLICATIONS

Atlas Wheel-Lift.
Century Wrecker Corporation Wheel-Lift Tow Truck.
EKA Model N0404.
Holmes International.

Primary Examiner—Robert J. Spar
Assistant Examiner—Stuart J. Millman
Attorney, Agent, or Firm—Cullen, Sloman, Cantor, Grauer, Scott & Rutherford

[57] ABSTRACT

A tow truck of the wheel-lift type is provided. In a first embodiment, a telescopic boom is supported by parallelogram linkage which is actuated by a hydraulic motor which is slightly inclined to the horizontal, the inner end of the boom, is its travel position being above and somewhat forwardly of the ring gear housing of the rear axle of the tow truck. The parallelogram linkage supports the boom through a boom support structure which permits it to be swung in a substantially horizontal plane, about substantially vertical pinions. The grid, which engages the wheels, includes a movable member which engages a wheel and raises it relative to the boom and grid, without movement of the boom. In a second embodiment, a substantially vertical post supports a parallelogram linkage which in turn supports a substantially horizontal extensible boom having a wheel grid at its outer end.

33 Claims, 10 Drawing Sheets

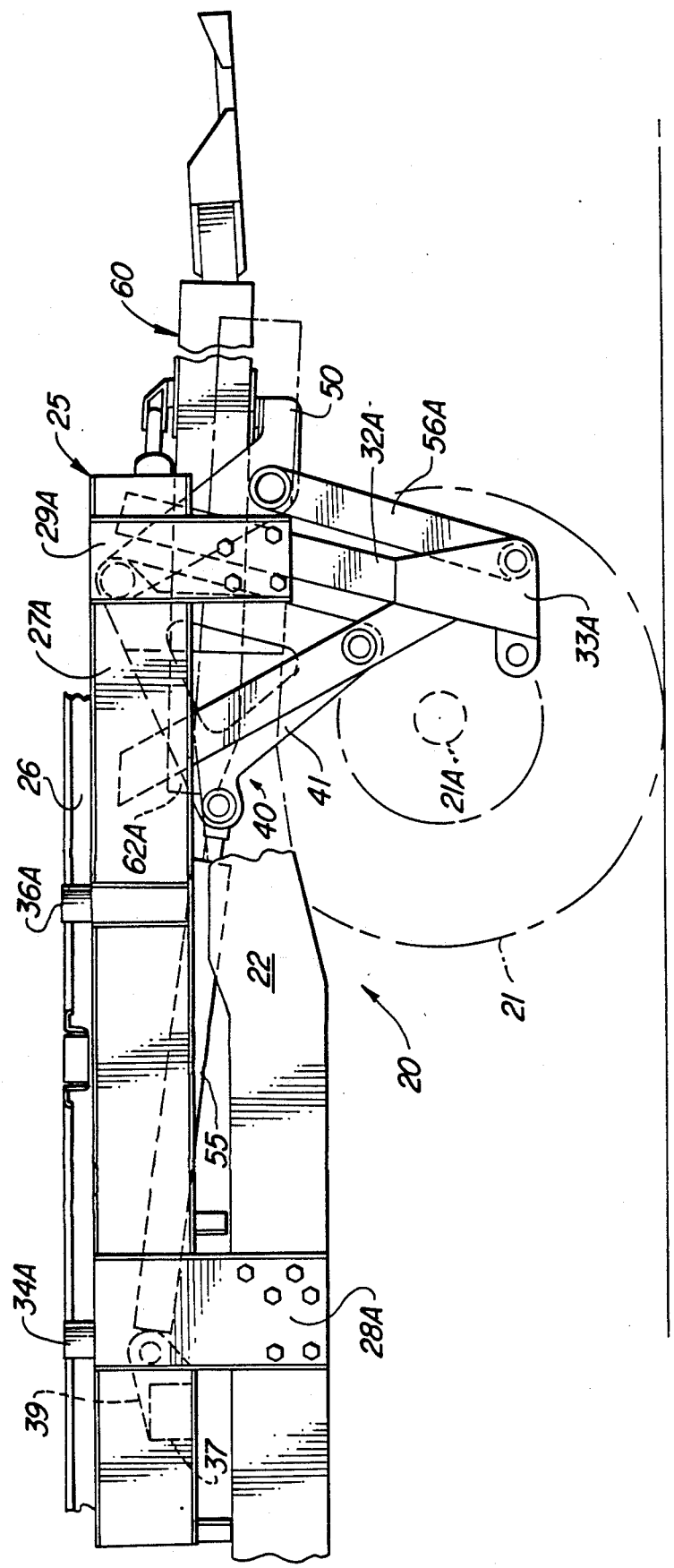

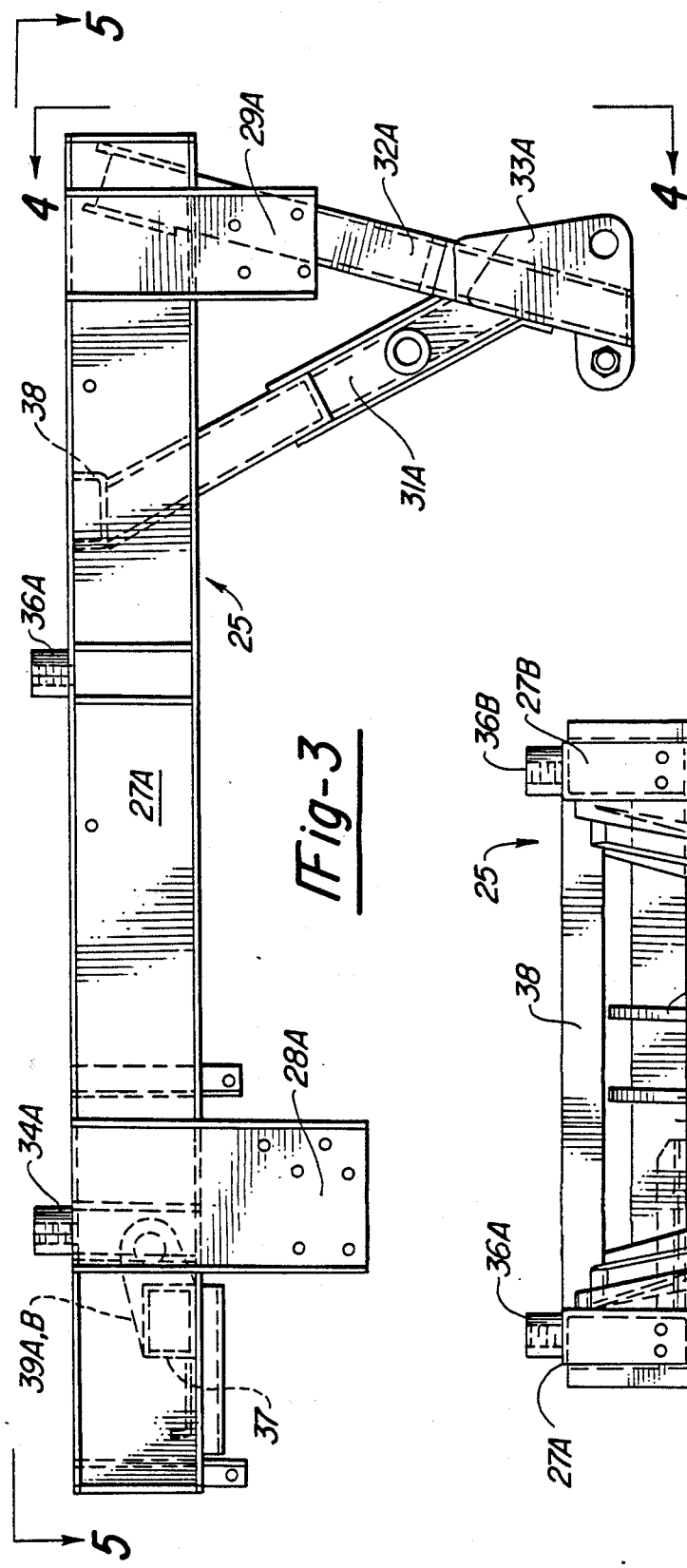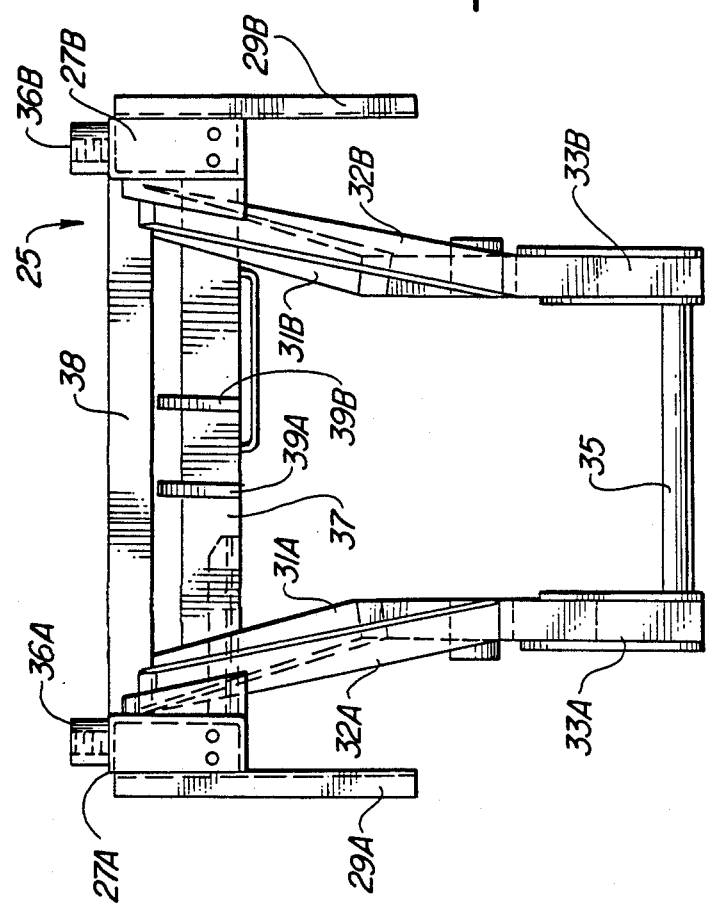

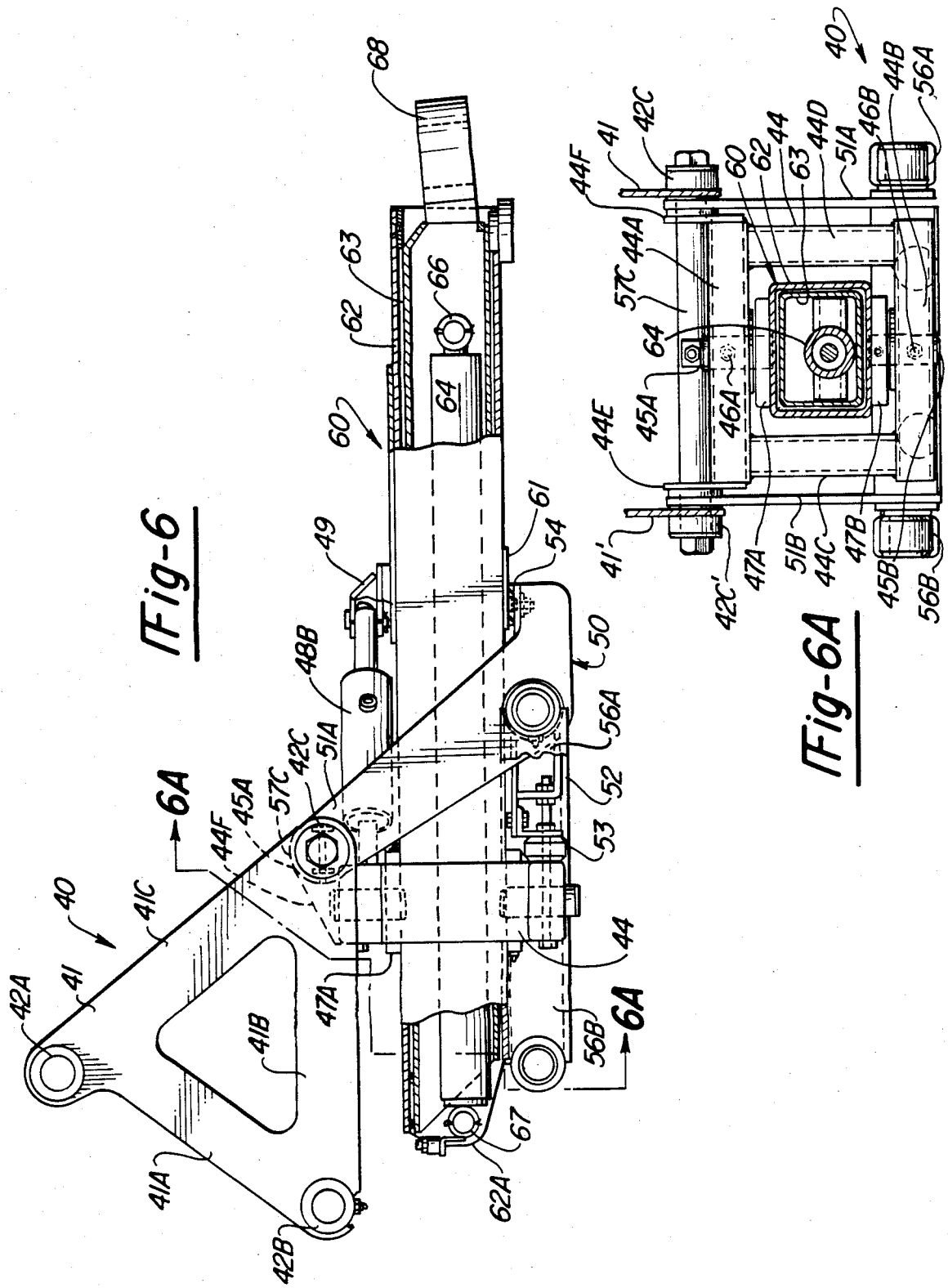

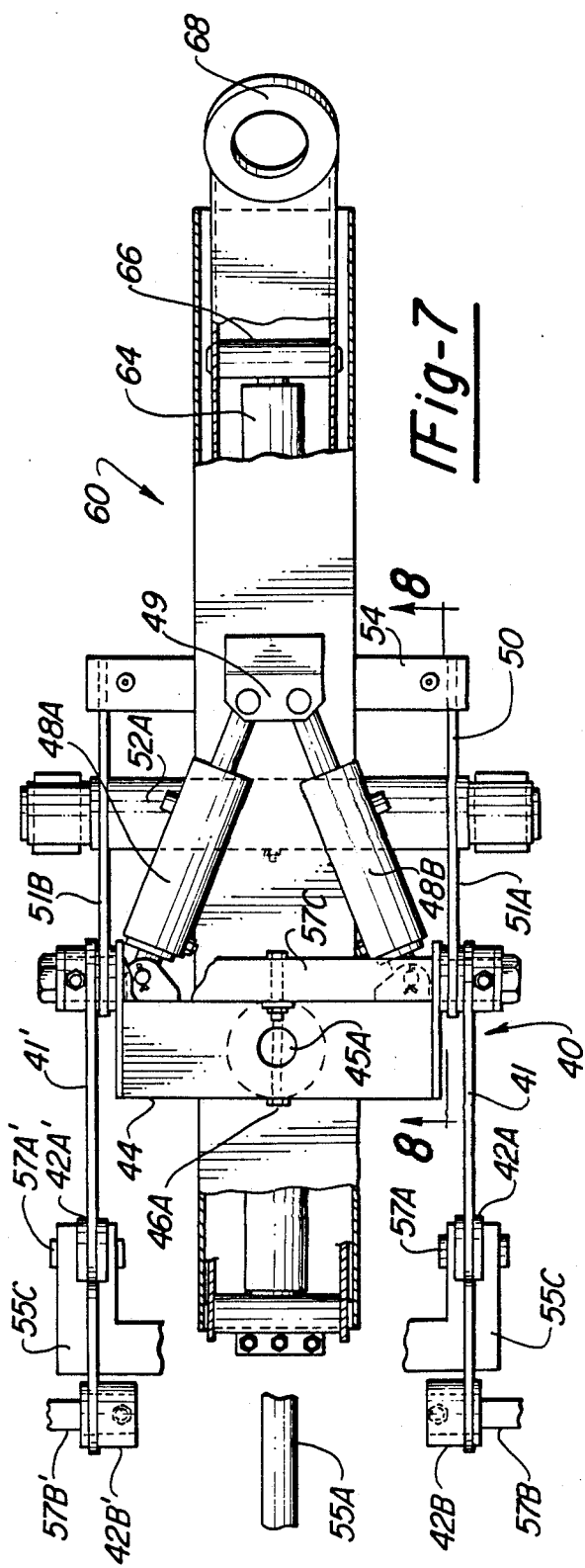
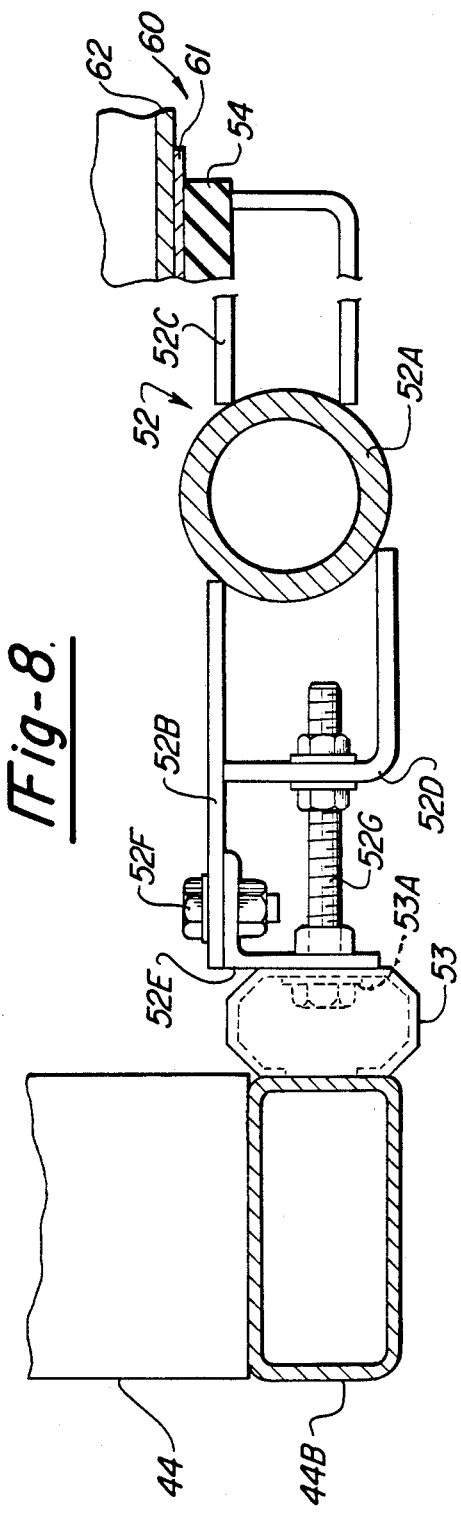

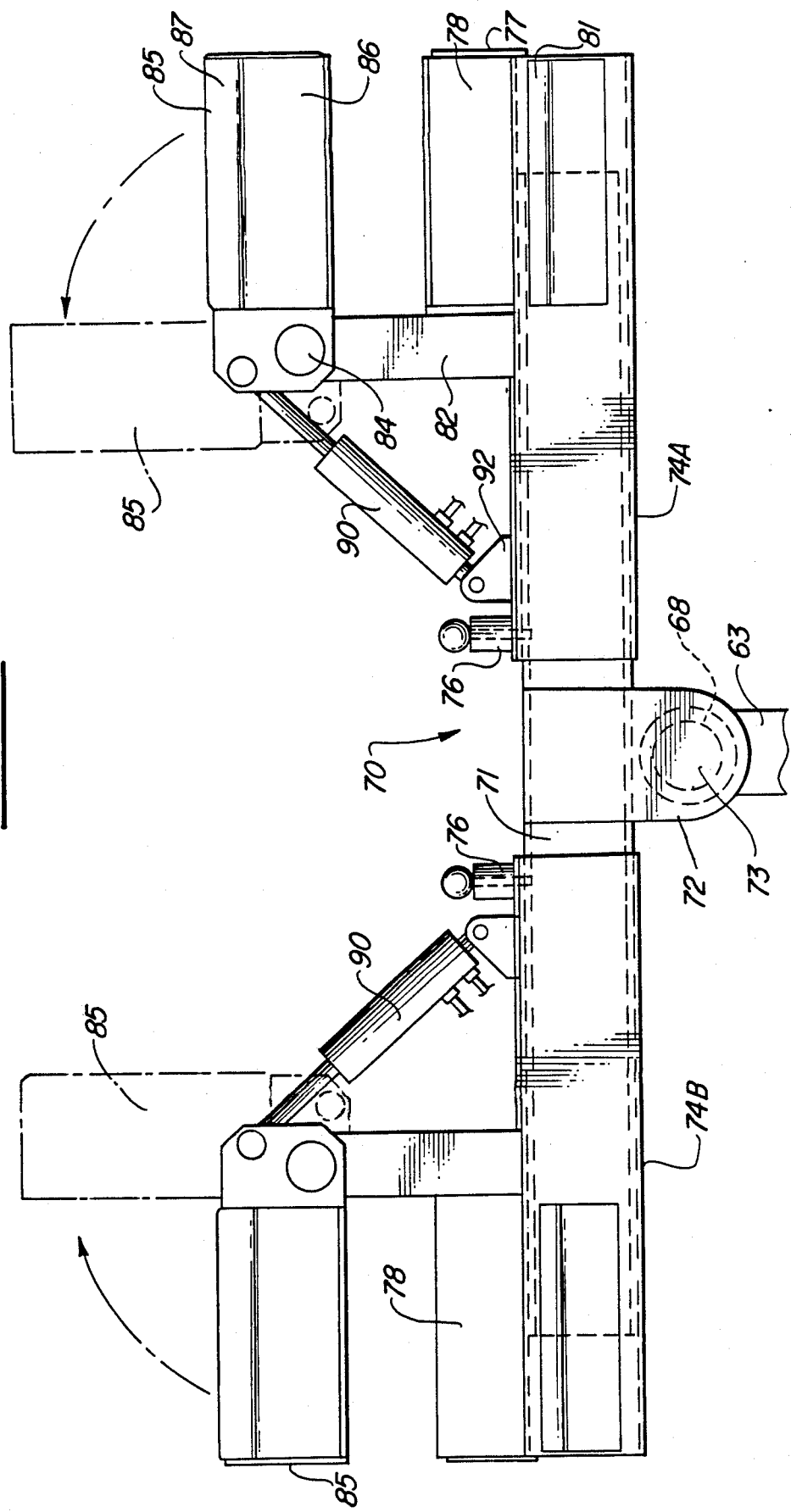

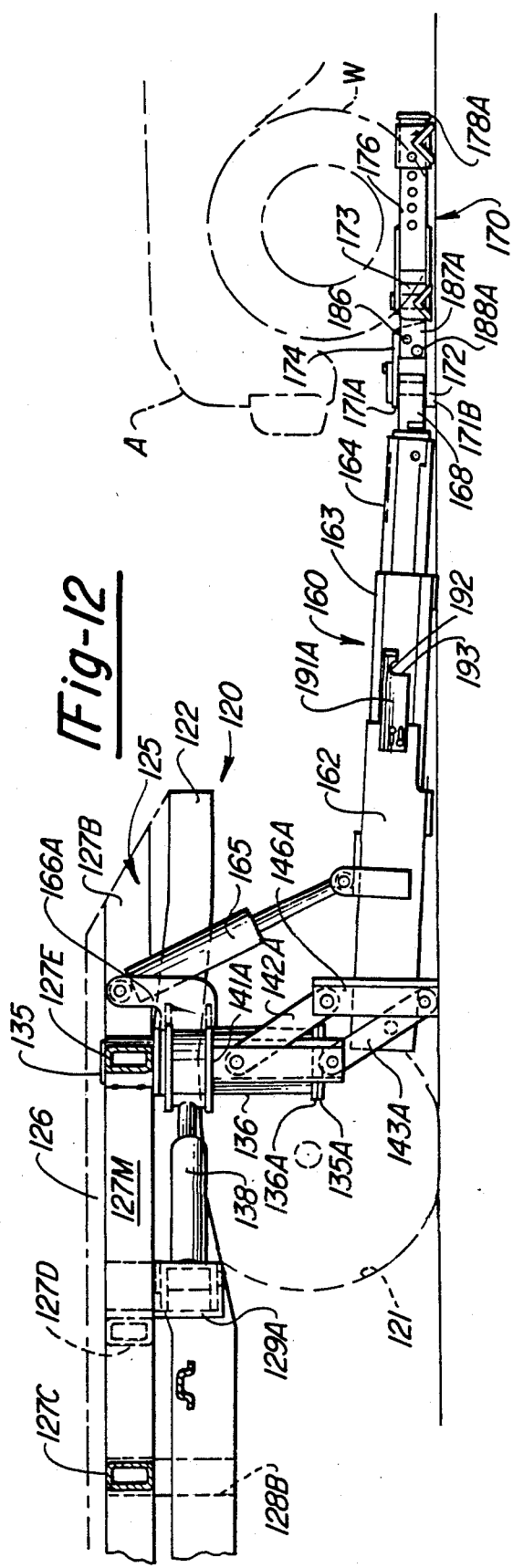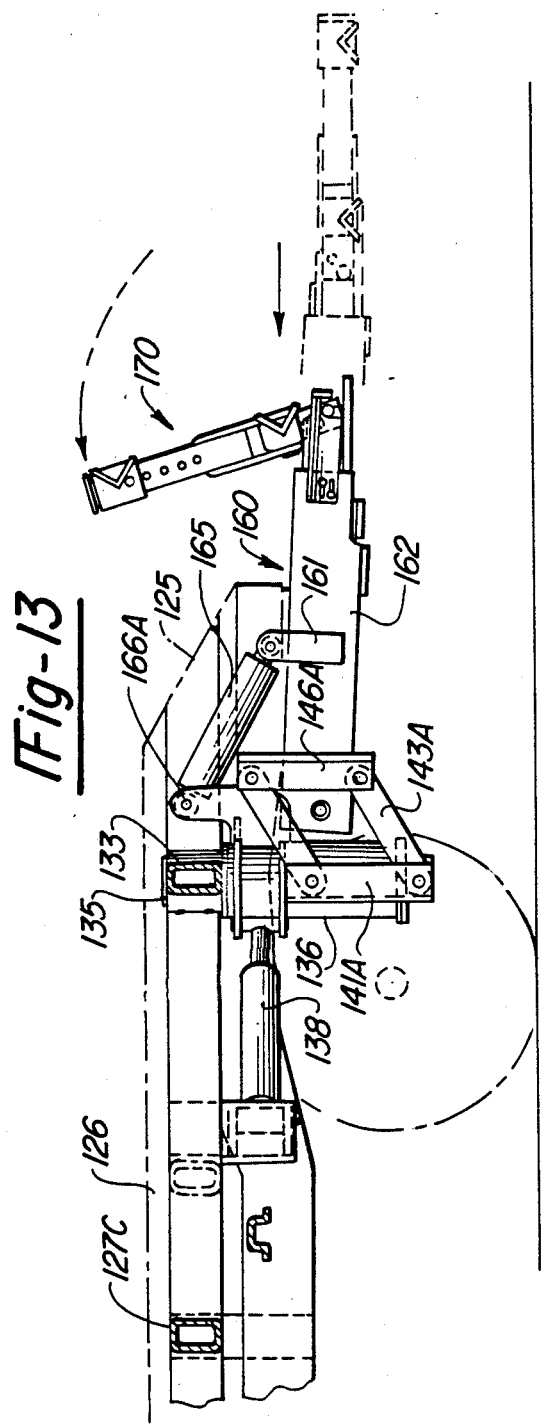

WHEEL-LIFT TOW TRUCK

BACKGROUND OF THE INVENTION

The present invention relates to tow trucks, for towing a disabled automobile, and more particularly to tow trucks which engage and lift the two front wheels or the two rear wheels of an automobile.

Tow trucks, for towing disabled automobiles by lifting either the front or rear wheels off the ground, and towing the partially-lifted automobile on its remaining two wheels, have long been used. Early versions of the tow truck provided a crane on the rear of the tow truck with a chain or cable having one or more hooks at their ends, which hooks engaged a part of the towed automobile adjacent the front or rear wheels, and lifted that part. Frequently, the hooks were attached to the chassis or, if the bumper was sufficiently securely attached, the hook may have been attached to the bumper. An example is Gaumont, U.S. Pat. No. 3,285,443. These hook-type wreckers or tow trucks were found with a change in automobile construction to be undesirable because there was danger of damaging the towed automobile, and as a result the so-called "sling" tow trucks were developed. In the sling-type tow truck, hooks were provided which engaged a part of the automobile, such as the axle, and these were connected through belts of flexible material, such as a rubber material, which could engage a part of the automobile, without damage: these belts were attached to a crane which could be raised and lowered, to thereby raise the front or rear end of the automobile. An example of a sling-type tow truck is Bubik, U.S. Pat. No. 3,620,393.

Another, and increasingly popular type of tow truck is that which is known as a "wheel-lift;" in this type of tow truck, the lifting of one end of the automobile is accomplished by engaging the wheels (tires) of the automobile at either the front or rear end of the automobile, and by raising the wheels raise that end of the automobile.

In a first type of wheel-lift tow truck, the tow truck has a crane which is secured to the tow truck behind the cab, and extends upwardly and rearwardly, a cable being connected to a winch and extending over a pulley or sheave on the end of the crane arm. A structure at the rear of the tow truck provides wheel-engaging elements, sometimes collectively referred to as the "wheel grid" and a connecting structure is provided between the wheel grid and the rear of the tow truck, the cable being attached to the connecting structure and effecting raising of the wheel grid and the automobile wheels upon actuation of the winch. Examples of this type of wheel-lift tow truck include Nelson, U.S. Pat. Nos. 3,051,337; Wagner, 3,182,829; Nelson, 3,434,607; Gaumont, 3,690,482; Pigeon, 3,924,763; Haring, 4,034,873; Peterson, 4,384,817; and Cannon, Jr. et al., 4,451,193.

The foregoing type of wheel-lift tow truck requires a crane mounted on and extending over the rear deck of the tow truck, thereby preventing the utilization of the rear deck of the tow truck, that is, the space between the rear of the cab and the rear bumper, from supporting large objects which it may be desirable to carry on the tow truck. In addition, the appearance of such tow trucks is cluttered and unattractive, and such tow trucks prevent unobstructed viewing of the towed vehicle by the driver while in the driver's seat of the truck.

A second type of wheel-lift tow truck has a crane including an arm or boom which is pivotable about a horizontal axis, and is actuated by a motor, typically a linear hydraulic motor. Examples of such constructions include Bubik, U.S. Pat. No. 3,897,879; and Place, U.S. Pat. No. 3,908,842. A related construction is disclosed in Bubik, U.S. Pat. No. 3,620,393, a sling-type tow truck. In general, these tow trucks have the same deficiencies as noted in connection with the tow trucks of the first type.

A third type of wheel-lift tow truck has a wheel engaging grid, and a boom which extends forwardly from the grid to a pivotal connection about a horizontal axis located substantially above the chassis and just rearwardly of the cab, and extending rearwardly beyond the rear of the tow truck. This construction is exemplified by LoCodo, U.S. Pat. No. 4,264,262; and Brown, U.S. Pat No. 4,473,334.

A fourth type of wheel-lift tow truck is known, in which the boom and related lifting mechanism are located beneath the deck of the tow truck; see Lind, U.S. Pat. No. 4,473,237. In this construction, a boom has its inner end pivotally mounted adjacent the rear axle, has a wheel grid at its outer end, and is rotated upwardly about its inner end by a pair of linear hydraulic motors which extend substantially vertically downwardly, although at a slight inclination to the vertical, from a pivotal attachment somewhat rearwardly of the rear wheels of the tow truck. This construction has a number of deficiencies, as explained below.

The basic truck structure which is used for constructing tow trucks is known as a one-ton truck, and is also known as a 10,000 pound gross vehicle rating truck. These have a uniform distance between the rear axle and the rear bumper. The towing apparatus should be constructed so as to lift the automobile without damage to it. Since, as shown by the above-discusses prior art, a boom or equivalent is used to connect the wheel grid to the tow truck, there is the possibility of damaging the towed vehicle by engagement of a part of it by the wheel grid and/or by the boom. In some types of vehicle, such as vans and Jeeps, the danger is minimal since there is a very short distance between the bumper and the adjacent wheel axle, and therefore there is no part of the van or Jeep which is in danger of being engaged by the wheel grid or boom. At the other extreme are the vehicle constructions which offer the greatest likelihood of damage to the vehicle by the lifting apparatus; these constructions are those in which there is a very substantial overhang of the body or chassis, beyond the rear and/or front axle. A Chevrolet Corvette is an example of a currently manufactured automobile which has a very long overhang at both the front and rear. This latter type of automobile requires that there be a very substantial reach of the boom, measured from the center of the tow truck rear axle to the mid-point of the wheel grid: typically, a wheel grid has a first part which engages the lower forward part of a tire, and a second part which engages the lower rearward part of the tire. The reference point of the wheel grid, therefore, will be between these two parts, and is directly below the axle of the lifted wheels. To provide the required maximum reach, a boom is utilized. Maximum reach is therefore one significant factor in the construction of a tow truck.

Another factor which must be taken into consideration is the possibility that the part of the weight of the towed automobile which is borne by the tow truck may tend to tip the front of the tow truck upwardly about the rear wheels. The principle elements influencing such tipping are the amount of weight borne by the tow truck, and the location of that weight relative to the rear axle. The greater the weight acting upon the tow truck and the further it is from the rear axle, the greater willl be the tipping moment generated by the towed automobile. The tipping moment may be even greater while towing, when dynamic forces generated by road irregularities increase the tipping forces. Consequently, to prevent the tow truck from tipping about its rear wheels—particularly while towing—the wheel grid should be as close as possible to the rear bumper of the tow truck, without risking damage to the automobile by engagement with the tow truck during turning, in which position the towed automobile is at an angle to the tow truck, and one corner or the other of the towed automobile is in danger of engaging an adjacent corner of the tow truck. To achieve minimum reach, the boom is made telescopic.

With a two-section boom as heretofore used, once the length is determined for maximum reach, the close-in or minimum reach is greater than desirable, considering the tow truck tipping moment. Thus, the construction disclosed in Lind, U.S. Pat. No. 4,473,237, is able to achieve either suitable maximum reach, or suitable close-in reach, but not both, and so has a limited range of the reach thereof. Parenthetically, in Brown, U.S. Pat. No. 4,473,334, a counterweight tank is provided at the front bumper of the tow truck to counteract the tipping moment, this tow truck having a two-section boom.

Although the range of movement of a retractable boom can be increased by utilizing a three-section boom, this solution is undesirable for the reason that the three sections tend to have "play" in them after a period of use. Consequently, when a bump or other road irregularity is encountered, unwanted raising and lowering movement on the wheel grid results in an action which is somewhat enhanced due to the fact that in the wheel-lift type tow trucks the sprung suspension system of the towed automobile is operative. As a result of either or both of these factors, up and down loads are generated which are undesirable. In addition, a three-section boom is more expensive than a two-section boom. To construct a three-section boom which will not have "play" requires additional strength, and a construction that is heavier and more expensive.

A further deficiency of Lind, U.S. Pat. No. 4,473,237, is that when the boom is in the towing position, it is inclined, providing some inclination for the wheels to roll out of the wheel grid.

The wheel-lift tow trucks of the prior art have required maneuvering of the entire tow truck in order to position the wheel grid properly in relation to the wheels of the automobile to be towed. This is because the boom has most frequently extended rearwardly from the tow truck and has been moveable only about a horizontal axis, as in Peterson, U.S. Pat. No. 4,384,817, and Cannon, Jr. et al., U.S. Pat. No. 4,451,193. However, some constructions of the first type above mentioned have provided not only vertical swinging movement of the boom about a horizontal axis, but in addition have provided horizontal swinging movement about a vertical axis, examples of such construction being Gaumont, U.S. Pat. No. 3,285,443 (a hook-lift tow truck); Gaumont, U.S. Pat. No. 3,690,482; and Pigeon, U.S. Pat. No. 3,924,763. In these constructions, however, the weight of the boom and grid are supported by a depending chain or cable which limits the ability of the boom to swing horizontally; i.e., the boom must rise as it is being swung on the vertical axis, unless the operator is able to pay out the chain or cable the amount necessary to keep the grid at the selected elevation while it is being swung horizontally. Such constructions in practice have not permitted the ready positioning of the wheel-grid, without maneuvering the entire tow truck to position the wheel grid; the truck is required to be placed in advance of the vehicle to be towed, a positioning that is often not possible in practice.

The wheel grid constructions heretofore used have provided a pocket for receiving a wheel (tire) of the towed vehicle. Examples of such construction include Nelson, U.S. Pat. No. 3,434,607, in which inclined plates engage the front and rear lower portions of the wheel; Gaumont, U.S. Pat. No. 3,690,482, which provides a pan with a forward portion engaging the lower forward portion of a tire, together with a hook for the axle; Pigeon, U.S. Pat. No. 3,924,763, which provides a rearward surface tire engaging element which is moveable when the wheel grid is raised or lowered; and Haring, U.S. Pat. No. 4,034,873, which provides front and rear inclined surfaces, etc.

LoCodo, U.S. Pat. No. 4,264,262, provides a wheel grid in the form of a wedge, which is caused by extension of the boom to move under and lift two automobile wheels, by wedging action; a suitable block is then placed on the wedge at the rear of each of the wheels, the wedge having holes for receiving pins extending from each block. In another construction, Brown, U.S. Pat. No. 4,473,334, the wheel grid includes U-shaped elements pivoted to a crossbar on a vertical pivot, swinging into position when one portion of the U-shaped element engages the front of a tire, upon extension of the boom. The constructions of the prior art do not provide for movement of the wheel of the towed vehicle in an upward direction without movement of the boom, thereby risking engagement of a part of the automobile with the wheel grid or boom when the boom is raised, and the wheel grid moves upwardly relative to the chassis of the automobile, due to such factors as deflection of the automobile sprung suspension system and changing of the shape of the tires due to the different load points caused by the wheel grids engaging the tires at positions upwardly from the part of the tire which engages the ground.

BRIEF SUMMARY OF THE INVENTION

A wheel-lift type of tow truck is provided having an extensible boom, a wheel grid, and apparatus including a motor and linkage for raising and lowering the boom and wheel grid which are located below the deck of the tow truck. The motor is positioned at a slight incline to the horizontal, and is connected to a pair of parallel bell cranks pivoted to the tow truck structure and having a boom support structure pivoted to them. A pair of links are each pivotally connected to the fixed chassis structure and to the boom support structure, and each is parallel to an arm of a bell crank. Thereby the boom is raised and lowered as an entirety by a parallelogram linkage. The boom support includes a hollow frame carrying a pair of aligned, vertically extending pinions which support the boom for horizontal swinging movement. A part of the load of the boom and towed automobile is carried by a plate underlying the boom and engaging the bottom of the boom in all positions of it in its horizontal swinging movement. A pair of hydraulic motors are provided to cause the boom to swing horizontally, In an alternate embodiment, a rotary post supported on the tow truck chassis in a substantially vertical position is connected to a telescopic boom by parallelogram linkage. The post and boom may be horizontally swung by a hydraulic motor, and the boom may be raised and lowered on the parallelogram linkage by another hydraulic motor.

The wheel grid for engaging the tires includes a crossbar connected to the outer end of the boom, and at each end of the bar, an inclined surface is provided for engagement with an automobile wheel. A pair of arms extend rearwardly from the crossbar, and generally perpendicular thereto, the arms pivotally supporting, at their outer ends, moveable arms which comprise inclined surfaces for engaging the lower portion of an automobile tire. Motors, such as linear hydraulic motors, are provided for moving the second arms between a first, open position in which they are substantially in line with the fixed arms, to a second position in which they are parallel to the crossbar, the moveable arms engaging and raising the wheels by wedging action as they come into the second positions thereof.

Among the objects of the present invention are to provide a tow truck of the wheel-lift type which is of improved visibility, uncluttered appearance and which provides for maximum range of reach of the wheel grid without the requirement of an unduly expensive telescopic boom.

Another object of the present invention is to provide a tow truck of the wheel-lift type which is relatively easy to engage with a vehicle to be towed and which provides for such engagement without undue maneuvering of the tow truck.

Still another object of the present invention is the provision of a tow truck of the wheel-lift type which enables the wheel grid and boom to have superior clearance with the parts of the towed automobile.

A still further object of the present invention is the provision of a tow truck of the wheel-lift type which will be able to engage and tow an automobile without substantial danger of tipping of the tow truck and without risk of damage to the towed automobile either during engagement or towing.

Further objects include the provision of a tow truck having a very large range of reach between retracted and extended boom positions, to provide such a range of reach using a two-section boom, and to provide an economical and strong tow truck which does not require positioning in front of the vehicle to be towed.

BRIEF DESCRIPTION OF THE DRAWING

FIG. 2 is a view similar to FIG. 1, with the parts in the raised position, and including additional structure.

FIG. 3 is an elevation view of a subframe forming a part of the tow truck of FIGS. 1 and 2.

FIG. 4 is an end view taken on the line 4—4 of FIG. 3.

FIG. 6 is an elevational view of the boom, boom supporting structure, and boom moving linkage, with parts broken away and in section.

FIG. 6A is a view taken on the line 6A—6A of FIG. 6.

FIG. 7 is a plan view taken on the structure of FIG. 6, with parts broken away and in section.

FIG. 8 is an enlarged cross-sectional view taken on the line 8—8 of FIG. 7.

FIG. 10 is a plan view of the wheel-grid forming a part of the present invention.

FIG. 12 is an elevational view, with parts in section, of an alternate embodiment of a wheel-lift type tow truck in accordance with the present invention, with the boom in the lower position.

FIG. 13 is a view similar to FIG. 12 with the boom in a raised position.

DESCRIPTION OF THE PREFERRED EMBODIMENTS

Figure 1:
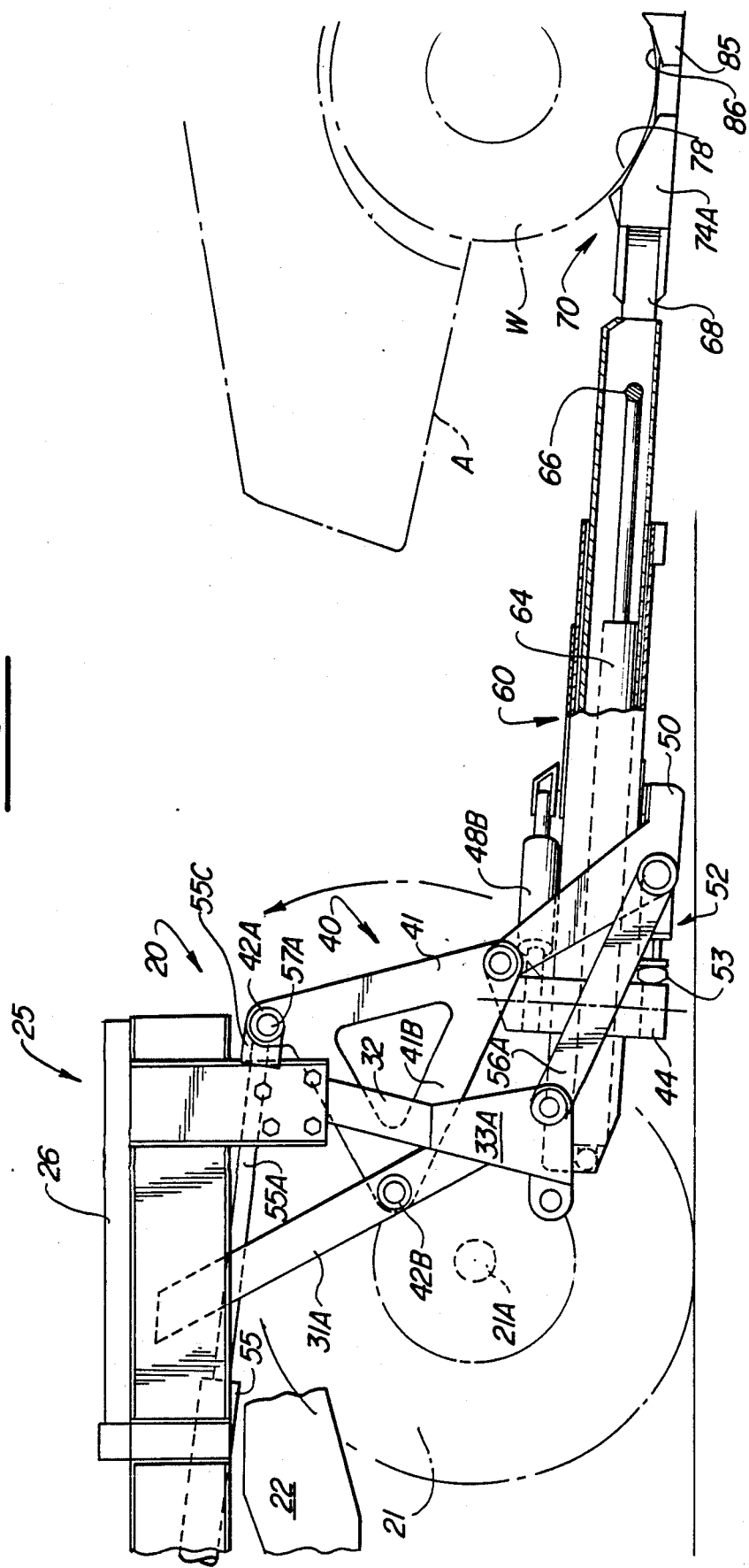
FIG. 1 is an elevational view of a portion of a first embodiment of a wheel-lift tow truck in accordance with the present invention, with parts removed and in section.

Referring now to the drawings, wherein like or corresponding reference numerals are used for like or corresponding parts throughout the several views, there is shown in FIG. 1 a portion of a tow truck 20 including a rear wheel 21, axle 21A, and a part of a truck chassis frame member 22, it being understood that there are two spaced-apart truck frame chassis members in accordance with conventional construction. A sub-frame 25 is mounted on the tow truck chassis in a manner to be hereinbelow described, and supports a deck 26. A boom supporting and moving structure 40 is supported by and beneath the subframe 25, the structure 40 movably supporting a telescopic boom 60, having at its outer end a wheel grid 70 for engaging the wheel W of an automobile A which is to be engaged and towed.

In FIG. 2, the subframe 25 is shown mounted upon and secured to the truck chassis frame, which includes the frame member 22 and its corresponding frame member (not shown). The subframe 25 includes a longitudinal channel member 27A, from which depends a front attachment member 28A and a rear attachment member 29A, these attachment members being secured to the chassis frame member 22, subframe 25 thereby being securely mounted on and having the longitudinal channel member thereof above the truck chassis frame members. A forward brace 31A extends downwardly and rearwardly from the channel member 27A and a rear brace 32A extends downwardly and forwardly from the rear part of channel member 27A. These braces are connected to a plate weldment 33A.

Extending upwardly from the upper surface of the channel member 27A are mounting pads 34A and 36A, which may be used for mounting on articles such as a winch on or above the deck 26. Deck 26 is of generally conventional construction, and is comprised of planks of extruded aluminum which are interlocked to form a strong deck.

FIG. 3 shows the subframe 25 without the deck 26, subframe 25 including the channel member 27A, the front and rear attachment members 28A and 29A, the forward and rear braces 31A and 32A, and the plate weldment 33A. The mounting pads 34A and 36A are also shown.

In FIG. 4 there is shows the parallel, spaced apart channel members 27A and 27B forming the sides of the subframe 25, mounting pads 36A and 36B, the forward braces 31A and 31B and the rear braces 32A and 32B, depending from the channel members 27A and 27B, respectively, and supporting the plates 33A and 33B. A stabilizing bar 35 extends between the plates 33A and 33B, a front cross-member 37 extends between the channel membres 27A and 27B, and above the level thereof there is a rear cross-member 38, also extending between the channel members 27A and 27B.

Figure 5:
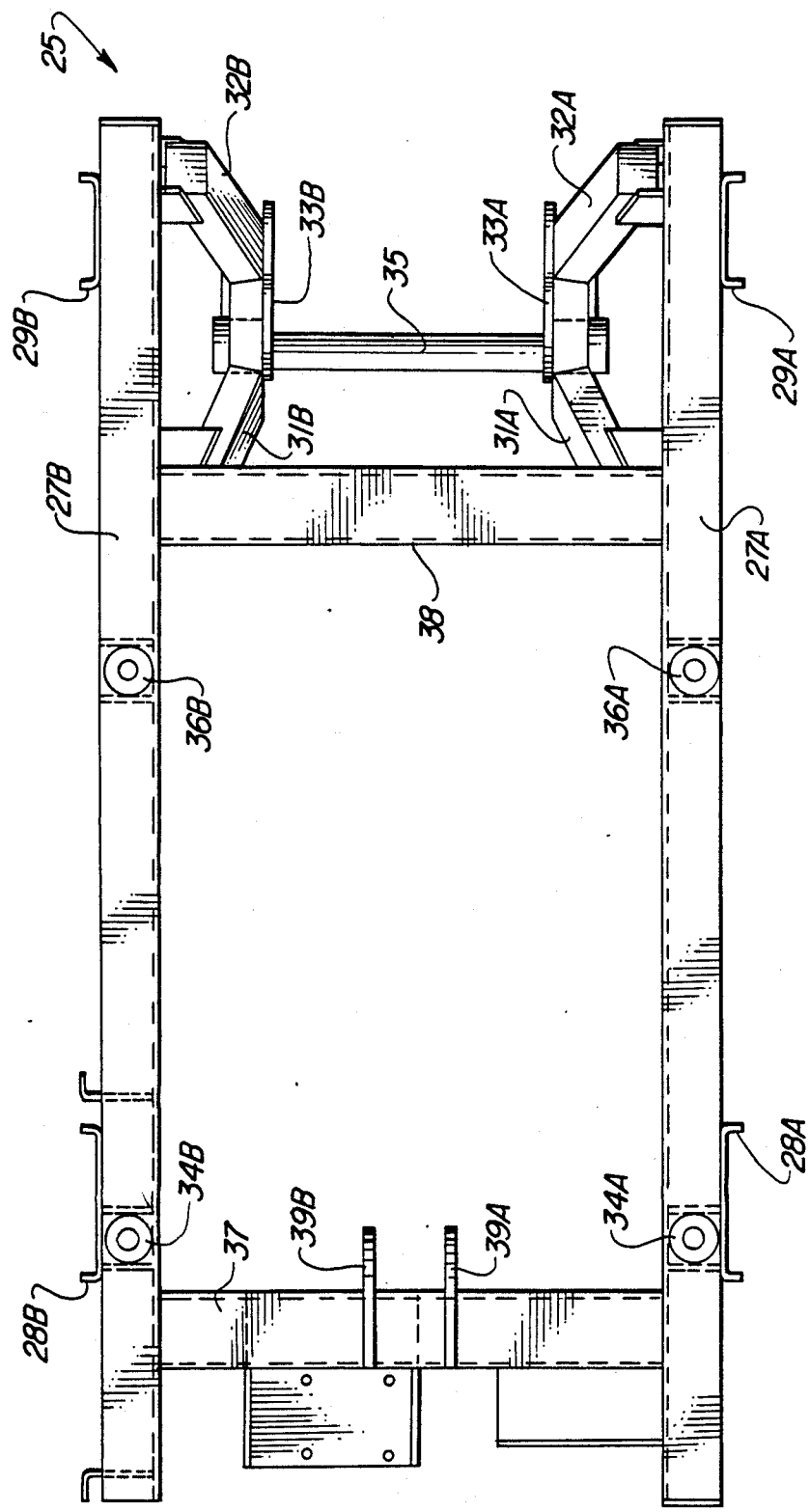
FIG. 5 is a plan view taken on the line 5—5 of FIG. 3.

The above-described elements forming the subframe 25 are shown in FIG. 5, it being noted that on the front cross-member 37 are ears 39A and 39B extending rearwardly and provided with openings therethrough (see FIG. 3). The subframe 25, as above noted, is placed upon and is secured to the frame members of the truck chassis, is covered with a deck 26 as shown in FIGS. 1 and 2 and provides a support for the boom supporting and moving structure 40.

There is shown in FIG. 6 the boom supporting and moving structure 40, including a cranked lever 41 having three sides 41A, 41B, and 41C. Cranked lever 41 as shown is therefore of generally triangular configuration, and has bearings 42A, 42B, and 42C at the apices thereof.

Extending downwardly from the bearing 42C and journalled about the axis thereof is a boom pivot support generally designated 44, and as shown in FIG. 6A, is in the form of an open, rectangular frame having parallel upper and lower members 44A and 44B and connecting vertical members 44C and 44D. An upper pivot pin 45A extends through the upper member 44A of boom pivot support 44, and a lower pivot pin 45B, extending on the same vertical axis as the pivot pin 45A; extends through the member 44B. Pivot pin 45A is held in the member 44A by bolt 46A, and a similar bolt 46B secures the pivot pin 45B in place. The pivot pins extend into recesses in the upper and lower plates of the boom 60, passing through bearing blocks 47A and 47B.

Referring now to FIG. 7 there may be seen the boom 60 extending through the frame provided by the boom pivot support 44. There is also shown the pivot pin 45A and the bolt 46A. A pair of hydraulic motors 48A and 48B are pivotally connected to the boom pivot support 44, and have their piston rods pivotally connected to a bracket 49 secured to the upper surface of the boom 60. By selective actuation of the motors 48A and 48B, the boom 60 may be caused to swing horizontally, about the axis of the vertical pivot pins 45A and 45B.

Figure 9:
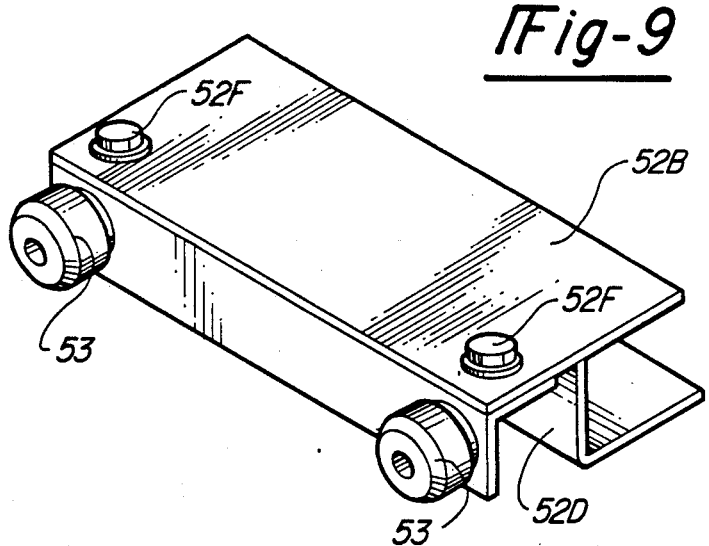
FIG. 9 is a perspective view of a portion of the structure shown in FIG. 8.

Referring again to FIG. 6, a boom supplemental support 50 has its upper end pivotally connected, like boom pivot support 44, about the axis of bearing 42C on the cranked lever 41. The boom supplemental support 50 comprises a pair of spaced side plates, 51A and 51B (see FIG. 6A) which extend downwardly and rearwardly from the bearings 42C and 42C', and together support a bottom beam 52. Bottom beam 52 comprises, as shown in FIG. 8, a tube 52A, top plates 52B and 52C, an angle 52D and an end angle 52E. End angle 52E is attached to the top plate 52B by fasteners 52F. A bolt 52G extends through the end angle 52E and the angle 52D, being secured by suitable nuts, and serves to secure a resilient shock absorber 53 onto the bottom beam 52. The shock absorber 53, is generally in the form of a hollow body of annular shape, an apertured plate 53A within the shock absorber 53 cooperating with a nut on the bolt 52G to hold the shock absorber 53 in position. Two shock absorbers 53 are provided in laterally-spaced relationship, as shown in FIG. 9, and engage substantially vertical surfaces of the boom support 44 and the boom supplemental support 50.

The bottom beam 52 includes a wear pad 54 secured to the plate 52C (see also FIG. 6), and engaged by a wear plate 61 on the bottom of base section 62 of the boom 60. The wear pad 54 has a substantially planar and horizontal upper surface, and thereby provides low friction engagement between the boom supplemental support 50 and the boom 60, so that the latter may be horizontally swung about the axis of the pivot pins 45A, 45B by the motors 48A and 48B. The construction permits, in a preferred embodiment, a horizontal boom swing of approximately sixteen degrees in either direction from the central position. In addition, during transportation of a disabled automobile, shocks and forces tending to "bounce" the boom 60 in a vertical plane are absorbed by the shock absorbers 53, it being noted that the boom pivot support 44 and the boom supplemental support 50 are free to rotate relative to each other about the axis of bearing 42C.

Referring again to FIGS. 1 to 2, there are shown the boom supporting and moving structure 40 including the crank lever 41, the bearing 42B of which is secured to forward braces 31A and 31B of subframe 25, and the bearing 42A of which has pivotally connected to it the piston rod 55A of a linear hydraulic motor 55. As shown in FIG. 2, the motor 55 is slightly inclined downwardly and rearwardly from its pivotal connection, by means of the ears 39A, 39B on the front cross-member 37. Motor 55, due to its slight inclination, occupies a vertical extend just slightly greater than its diameter.

A link 56 is pivotally connected to the plate weldment 33A, and to the boom supplemental support 50. The link 56A is of equal length to the arm 41B of the cranked lever 41 and is parallel to it; as a consequence, the arm 41B and link 56A form parts of a parallelogram, the other parts of which are the boom supplemental support 50 and the lower part of brace 31A and plate weldment 33A.

As is shown in FIGS. 6A and 7, the boom supporting and moving structure 40 includes the pair of cranked levers 41 and 41', cranked lever 41 being pivotally supported on brace 31A and cranked lever 41' being pivotally supported on brace 31B. pins 57B and 57B' pivotally connect the levers 41 and 41' to the braces 31A and 31B. Pivot pins 57A and 57A' extend through the bearings 42A and 42A', the piston 55A of the linear hydraulic motor 55 being secured to the pivot pins 57A and 57A' by a yoke 55C shown broken away in FIG. 7. A shaft 57C (FIGS. 6 and 6A) extends between the bearings 42C and 42C', and serves to connect the cranked levers 41 and 41'. Shaft 57C is a support member for pivotally supporting the side plates 51A and 51B of boom supplemental support 50, and for pivotally supporting the boom pivot support 44, passing through ears 44E and 44F which extend from the upper horizontal member 44A thereof.

In a preferred embodiment, the boom is shifted approximately 12½" horizontally by the motor 55 and moving the cranked levers 41 and 41'. This adds significantly to the range of reach of the boom.

The boom 60 comprises a base section 62, preferably in the form of a hollow rectangular tube, as shown in FIG. 6A, within which is telescoped a fly section 63. A linear hydraulic motor 64 has its piston rod connected to a bar 66 in and joined to the fly section 63, and has its inner end connected to a bar 67 extending in and joined to the base section 62 at its inner end 62A. The fly section 63 carries at its outer end a bearing 68. In a preferred embodiment, the boom 60 extends to 32½", providing a range of reach of 45".

Referring now to FIG. 10, there is shown the wheel grid 70 including the cross bar 71 having, at the center thereof, forwardly extending ears 72 between which there is the bearing 68; a pin 73, serves to pivotally connect the cross bar 71 to the bearing 68, thereby pivotally connecting the grid 70 to the boom 60 for movement through substantially 180°. A sleeve 74A is telescoped over one end of the cross bar 71, and a corresponding sleeve 74B is telescoped over the other end thereof. A detent 76 of known construction enables the sleeve 74A to be positioned as desired on the cross bar 71 to thereby adjust for different automobile treads. The sleeve 74A includes a rearwardly extending member 77 having an inclined surface 78 which is inclined so as to engage an automobile wheel (tire). On the sleeve 74A, and forwardly of the surface 78 (see also FIG. 11) is an abutment 79 having a relatively steeper surface 81.

Figure 11:
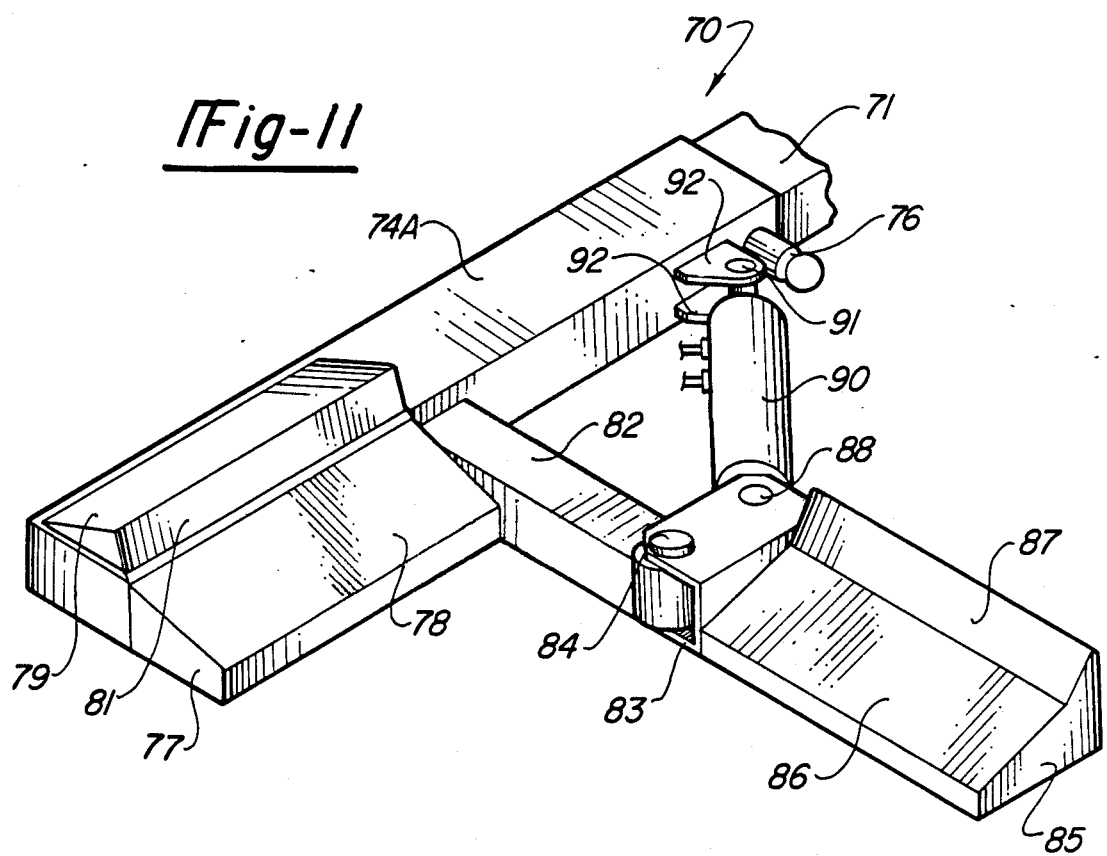
FIG. 11 is a perspective view of a portion of the wheel grid, in the open position.

As shown more particularly in FIG. 11, an arm 82 is fixed to the sleeve 74A, extending rearwardly and perpendicularly to the sleeve 74A. At its rear or outer end, the arm 82 is received in a channel 83, channel 83 being pivotally connected to the arm 83 by a pivot pin 84. The channel 83 forms a part of a pivoted arm 85, having a first relatively slightly inclined surface 86, and a second more steeply inclined surface 87. The channel 83 is connected by a pin 88 to a linear motor 90 which is pivotally connected by a pin 91 between a pair of ears 92, extending rearwardly from the sleeve 74A. The hydraulic motor 90 is supplied in conventional fashion with fluid to cause it to extend and retract, this action causing the arm 85 to rotate between a first position, shown in dashed lines in FIG. 10, in which the wheel grid is "open" and the arm 85 does not engage a wheel of an automobile, to a second position, shown in full lines, in which arm 85 engages the wheel of the automobile.

More particularly, the movement of the arm 85 from the open position to the closed or wheel engaging position serves not only to form a support for the wheel to enable the automobile A to be lifted, but the wheel grid 70 itself by that action serves to lift the automobile wheel without movement of the boom 60. This is due to the wedging action which is effected by the horizontal swinging movement of the arm 85 and the engagement of the surface 86 thereof with the wheel, prior to the time that the arm 86 is in the second position, shown in full lines in FIG. 10, and shown also in FIG. 1.

In operation, the tow truck 20 is driven to the location of the disabled automobile, and is then maneuvered so that it is generally in alignment with the disabled automobile; alternatively, if the space in front of the automobile is not available, the tow truck may be somewhat out of line with the automobile or may be in an adjacent traffic lane. The boom 60 in the transport position shown in FIG. 2 is supported by the boom supporting and moving structure 40 with the inner end 62A above the rear axle ring gear housing (not shown) of the tow truck 20, and somewhat forwardly of a vertical plane through the axis of the rear wheels and axle. This positioning of the boom 60 enables the automobile towed by tow truck 20 to be at a very short distance rearwardly of the axis of the rear wheels and axle of the two truck 20. This is the inner position for the "reach" of the boom 60. The hydraulic motor 55 is then actuated, causing the boom supporting and moving structure 40 to move bottom 60 entirely by rotational movement of the cranked levers 41 and 41'; there is moved, by means of the above-noted parallelogram linkages, the boom pivot support 44, boom supplemental support 50, and boom 60 as an entirety. The boom 60 is then extended by motor 64 so that it is placed in the position shown in FIG. 1 with the grid 70 on the ground and in the open position. This is the outer position for the "reach" of the boom 60. As necessary, the boom 60 may be swung by motors 48A and 48B about the axis of the pivot pins 45A and 45B, which may be slightly inclined to the vertical as shown in FIG. 1, the boom 60 being slightly inclined to the horizontal. The cross bar 71 may be pivoted on the boom 60. If the automobile to be towed has a tread not readily accommodated by the existing positioning of the sleeves 74A and 74B of the grid 70, suitable adjustment may readily be made by manipulation of the detents 76. The movable arms 85 will be in the first or dotted line position as shown in FIG. 10, and then the hydraulic motors 90 will be actuated to cause the movable arms 85 to rotate towards the second, full line position as shown in FIG. 10. At this time the surfaces 78 of the sleeves 74A and 74B will be in engagement with the wheels (tires) of the automobile to be towed, and the continuing movement of the arms 85 will cause the arms to engage the lower portions of the wheels (tires) and, without movement of boom 60 raise the wheels thereby providing an additional clearance between the automobile parts and the structure of the grid 70 such as the motors 90 and the sleeves 74A and 74B. Once the arms 85 have reached their closed position, the hydraulic motor 55 is actuated to raise the boom 60 and the automobile A. Once the grid 70 is clear of the ground, the motor 64 may be actuated to retract the boom fly section 63, thereby drawing the automobile A closer to the rear of the tow truck 20.

Further actuation of the hydraulic motor 55 will effect both a raising movement and a forward movement of the boom 60 and the wheels W of the automobile A which may then be positioned as closely as possible to the rear wheel of the tow truck 20, without risk of damaging the automobile A during turns.

Conventional straps (not shown) are used to secure the wheels to the grid 70.

Figure 14:
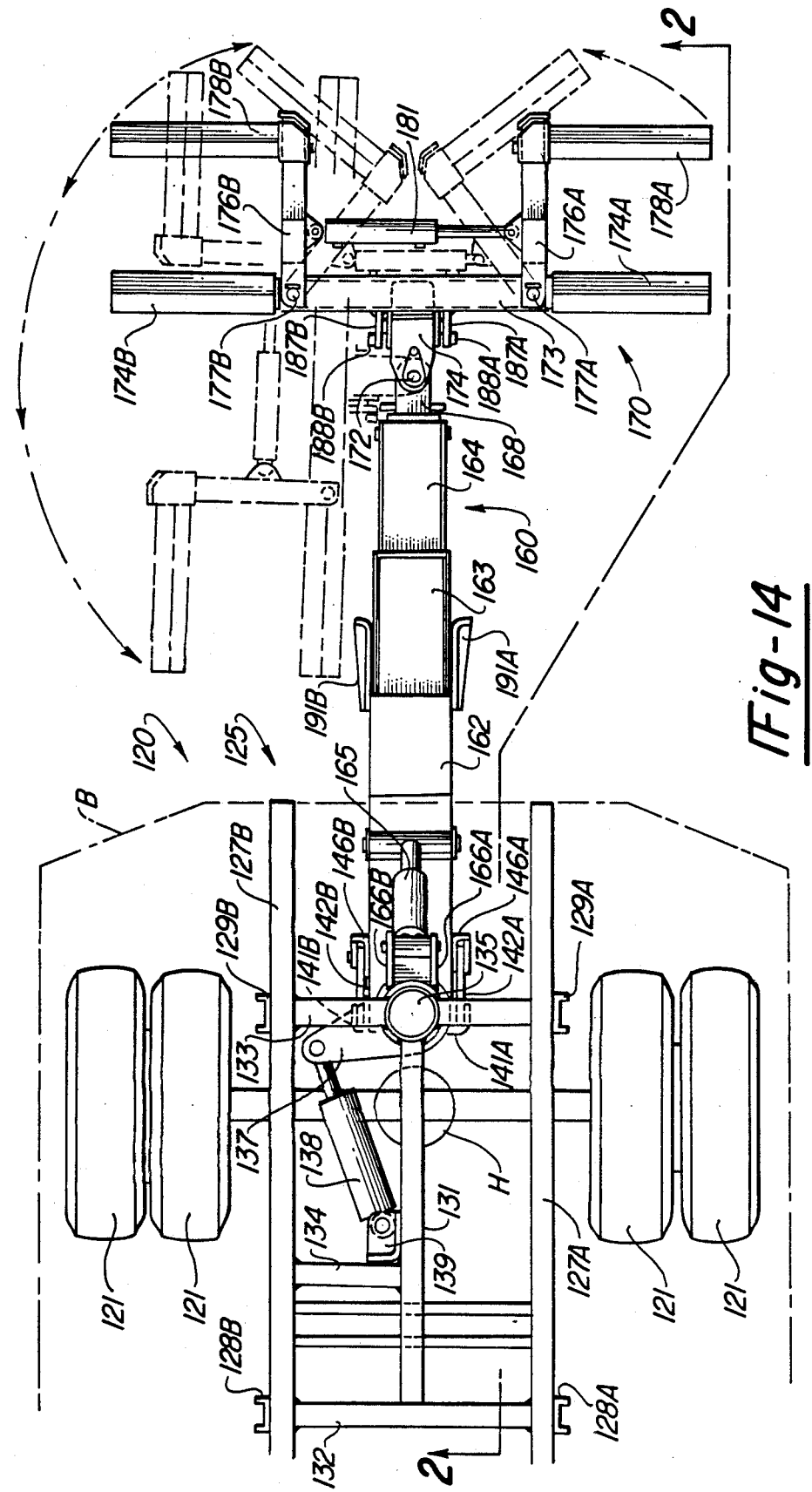
FIG. 14 is a plan view of the wheel-lift tow truck of FIG. 12.

The second embodiment of the wheel-lift tow truck in accord with the present invention is shown in FIGS. 12-14, wherein there is shown a tow truck 120 provided with the usual rear wheels 121 connected to a pair of convention chassis frame members; one such member 122 is shown in FIGS. 12 and 13. A subframe 125 is on and supported by chassis members 122 and includes a deck 126 supported by (see FIG. 14) longitudinally extending frame members 127A and 127B. Front attachment members 128A and 128B and rear attachment members 129A and 129B serve to connect the subframe 125 to the chassis frame members 122. The subframe 125 includes an intermediate longitudinal member 131, which is parallel to and lies between the channel memberes 127A and 127B, extending from a forward cross member 132 to a rear cross member 133, passing over the rear axle ring gear housing H of the tow truck 120. An intermediate transverse member 134 extends between the intermediate longitudinal member 131 and the channel frame member 127B. The drive shaft of tow truck 120 has been omitted as it is part of a conventional tow truck, there being shown however in dashed lines, a body B which is formed of sheet metal and which extends over the dual drive wheels 121.

Secured to the subframe 125, and the depending through it, is a post 135, which is substantially vertical. The upper part of the post 135 is welded to the intermediate longitudinal member 131 and to the rear cross member 133, which is in two parts. At its bottom the post 135 has an outstanding flange 135A, and a sleeve 136 is journalled on the post 135, having at its lower end a flange 136A engaging the flange 135A of post 135. Sleeve 136 is caused to rotate by movement of a radially extending arm 137, secured to it and acted on by the piston rod of a linear hydraulic motor 138 secured to a bracket 139.

A pair of vertically extending angle members 141A and 141B are secured to the sleeve 136, so that portions thereof are spaced from the sleeve 136 (see FIG. 14). Upper links 142A and 142B are pivotally connected to the angle members 141A and 141B, respectively, and a pair of lower links of which link 143A is shown on the drawings, are also connected to the angle members 141A and 141B. At their outer ends, the links 142A and 143A are pivotally secured to a channel 146A, and the corresponding links are secured to a channel 146B. The channels 146A and 146B extend in parallel relationship to the flange members 141A and 141B, and the links 142 and 143 serve to form, with the angle members 141 and channels 146, a pair of spaced and parallel parallelograms. The channels 146A and 146B are secured to the rear of a telescopic boom 160, and a bracket 161 extends upwardly approximately at the mid-point of the base boom section 162. The boom 160 also includes mid-section 163 and fly section 164. The boom 160 may be extended and retracted in known manner by one or more hydraulic motors contained within it.

Boom 160 is moved in a vertical plane by a hydraulic motor 165 which is pivotally connected to a pair of brackets 166A and 166B which extend in parallel relationship and are secured to the sleeve 136.

At its outer end, the fly section 164 carries a bearing 168 which pivotally supports a wheel grid 170. The grid 170 includes (see FIG. 12) a pair of spaced ears 171A and 171B, a pivot pin extending through them, and the bearing 168. A cross arm 173 is pivotally secured to a block 174 from which the ears 171 extend, cross arm 173 having wheel-engaging members 174A and 174B of inverted-V shape in alignment therewith. Inwardly of the wheel-engaging members 174A and 174B are arms 176A and 176B which are pivotally mounted by pivot pins 177A and 177B to the cross-arm 171. At their outer ends, the arms 176A and 176B have fixed to them transversely extending wheels-engaging arms 178A and 178B. A hydraulic motor 181 is pivotally connected to the arm 176B, and has its piston rod pivotally connected to the arm 176A. When the members 174A and 174B have been caused to engage lower portions of the wheels (tires) of an automobile, the motor 181 is actuated to move the arms 176A and 176B, and 178A and 178B from the open, dotted line position to the closed, full line, positions shown.

The entire wheel grid 170 may be rotated through substantially 90 degrees on pivot pin 172, so that the cross bar 173 may lie substantially parallel to the boom 160.

The cross arm 173 is connected to the block 174, by a pivot pin 186 extending through the block 174, and between a pair of ears, 187A and 187B on the cross arm 173.

The pivot pin 186 is located above the central plane of the block 174. A roller 188A extends outwardly from the ear 187A, and a similar roller 188B extends outwardly from the ear 187B.

Mounted on the boom base section 162 are a pair of cam plates 191A and 191B. Each of the cam plates 191A and 191B has a downwardly facing cut-out 192 with a rearwardly facing surface 193. When the boom is retracted, the rollers 188A and 188B will engage the surface 193, and due to the location of the pivot pin 186, will cause the entire grid 170 to move from the position shown in FIG. 12 to the position shown in full lines in FIG. 13. The grid 170 is moved downwardly to the horizontal position, upon extension of boom 160.

The tow truck 120 is driven to the site of a disabled automobile with the parts in position as shown in FIG. 13, that is, with the boom 160 raised to an upper position by operation of the motor 165, and the parallelogram provided by the links 142 and 143, and the flange members 141 and channel members 146. upon arrival on the scene, the hydraulic motor 138 may be used to rotate the entire boom 160 on a substantially vertical axis, this being the axis of the post 135, due to rotation of sleeve 136. The boom 160 is extended, this action effecting downward movement of the wheel grid 170 from the slid line position shown in FIG. 13 to the dashed line position. The motor 165 is actuated to lower the boom 160 and wheel grid 170, and the motor 181 (FIG. 14) is actuated so that the arms 176A and 176B are moved to their inner or open positions, the wheel-engaging arms 178A and 178B moving with them to the dashed line positions shown in FIG. 14. The boom 160 is then further extended, until wheel-engaging members 174 engage the wheels W of the automobile A, and then the motor 181 is acutated to close the wheel engaging arms 178A, 178B. The boom 160 is raised, and the sleeve 136 and boom 160 are rotated as necessary by motor 138, and boom 160 is retracted. Retraction is halted prior to or at engagement of the roller 188 with the surfaces 193 on the cam plates 191.

As will be understood, in the construction shown in FIGS. 12-14, the parallelogram linkage is moved in a vertical plane by motor 165, and is rotated with the boom by motor 138.

There have been provided two embodiments of a tow truck of the wheel-lift type having uncluttered appearance, in both tow trucks herein disclosed the boom manipulating mechanism is located below a substantially clear deck. In the first embodiment herein disclosed, maximum range of reach of the wheel grid is provided by utilizing only a two-section boom, which is of less expensive construction than a three-section boom, together with apparatus for shifting the boom horizontally a substantial amount.

In both embodiments herein disclosed, a very substantial range of reach of the wheel grid is achieved, the first embodiment having a greater range of reach, and providing for raising of the inner end of the boom to a level above, and shifting it horizontally so as to be in advance of the ring gear housing, thereby providing for a close a positioning as possible of the towed vehicle to the tow truck.

Also in both embodiments herein provided, not only is there a hydraulic motor for raising and lowering the boom, but there is also a hydraulic motor or motors for horizontally swinging the boom, thereby enabling the tow trucks to be readily engaged with the automobile to be towed without extensive maneuvering of the tow truck into the desired position. The tow trucks provided herein, by being able to achieve not only substantial range of reach, but by having the towed automobile relatively close to the tow truck rear axle, also achieve stability of the tow truck, and avoidance of rearward tipping of the tow truck.

In accordance with the first embodiment, there has been provided a tow truck in which the wheel grid apparatus itself, without movement of the boom, achieves a raising of the wheels of the towed automobile relative to the wheel grid, to therey avoid possible engagement of the wheel grid with the towed automobile's structure.

It will be obvious to those skilled in the art that various changes may be made without departing from the spirit of the invention, and therefore the invention is not limited to what is shown in the drawings and described in the specification but only as indicated in the appended claims.

We claim:

1. A tow truck for lifting a part of a vehicle and towing the vehicle comprising:
   (a) a tow truck chassis including spaced frame members and a deck above said frame members, and said tow truck chassis having a forward end and a rearward end including a rear wheel axle,
   (b) means for engaging a vehicle for lifting a part thereof,
   (c) an extensible boom having an inner end and an outer end and means supporting said engaging means at said outer end,
   (d) means for raising and lowering said boom comprising:
      (i) linkage means for causing movement of said boom while maintaining said boom at a substantially constant angle to the horizontal, and
      (ii) motor means for causing said raising and lowering movement of said boom,
   (e) means for horizontally swinging said boom comprising:
      (i) means for pivotally supporting said boom for rotation about a substantially vertical axis, and
      (ii) motor means for effecting horizontal swinging movement of said boom,
   (f) said boom raising and lowering means and said boom swinging means being below said deck and said boom raising and lowering means moving said boom between a first position in which the inner end of said boom is rearwardly of said tow truck rear axle, and a second position in which the inner end of said boom is forward of the axis of said tow truck rear axle.

2. The tow truck of claim 1, said means for pivotally supporting said boom comprising a post, means for supporting said post on said frame members, and means rotatable on said post for pivotally supporting said boom from said post.

3. The tow truck of claim 2, said linkage means comprising parallellogram linkage connected to said rotatable means and to said boom.

4. The tow truck of claim 1, wherein the linkage means is supported on the means for pivotally supporting the boom.

5. The tow truck of claim 1, said means for pivotally supporting said boom for horizontal swinging movement comprising pivot means supported by said linkage means for raising and lowering said boom.

6. The tow truck of claim 5, wherein said linkage means comprises parallelogram linkage, and wherein the motor means for raising and lowering the boom is connected to said linkage, said motor means being slightly inclined to the horizontal.

7. A tow truck for lifting a part of a vehicle and towing the vehicle comprising:
   (a) a tow truck chassis including spaced frame members and a deck above said frame members, and said tow truck chassis having a forward end and a rearward end including a rear wheel axle;
   (b) means for engaging a vehicle for lifting a part thereof,
   (c) an extensible boom having a inner end and an outer end and means supporting said engaging means at said outer end, and
   (d) means for moving said boom and engaging means between a first position in which the engaging means is substantially at ground level, the entire boom is relatively close to the ground, and in which the inner end of said boom is rearwardly of said tow truck rear axle and a second position in which the entire boom and the engaging means are substantially above the ground and the inner end of the boom is
      (i) forward of the axis of said tow truck rear axle, and
      (ii) beneath said deck.

8. The tow truck of claim 7, said boom being a two-section telescopic boom.

9. The tow truck of claim 7, said boom inner end in said second position being at a level above the tow truck rear axle.

10. The tow truck of claim 7, said moving means being under said deck.

11. The tow truck of claim 7, said moving means comprising parallelogram linkage means, and means for connecting said linkage means to said boom and to said chassis.

12. The tow truck of claim 11, said moving means further comprising a linear fluid motor having the axis thereof slightly horizontally inclined, and means for connecting said motor to said linkage means.

13. The tow truck of claim 7, said moving means comprising a cranked lever, means on said frame members for pivotally supporting said cranked lever, and a motor connected to said cranked lever.

14. The tow truck of claim 13, means for supporting said boom, and means pivotally connecting said cranked lever to said boom supporting means.

15. The tow truck of claim 14, and a link parallel to one arm of said cranked lever and pivotally connected to said boom supporting means and to said cranked lever supporting means.

16. The tow truck of claim 14, said means for supporting said boom comprising vertical pinion means for permitting horizontal swinging of said boom.

17. The tow truck of claim 16, and motor means for swinging said boom about said pinion means.

18. The tow truck of claim 16, said boom support means further comprising means engaging said boom for resisting downward movement of said boom about a horizontal axis through the inner end of said boom.

19. The tow truck of claim 16, said boom support means further comprising a support structure including a plate extending beneath and engaging said boom rearwardly of said pinion means.

20. The tow truck of claim 14, said supporting means comprising an open frame, substantially vertical aligned pinion means carried by said frame, said boom extending through said frame and journalled on said pinion means.

21. The tow truck of claim 20, and motor means for horizontally swinging said boom on said pinion means.

22. The tow truck of claim 7 and support means carried by said boom, and means on said support means for engaging and lifting wheels of a towed vehicle while said boom is stationary.

23. The tow truck of claim 22, said support means for engaging and lifting wheels comprising a movable vehicle wheel engaging member, and means for moving said member from a first position in which it is not in engagement with the vehicle wheel to a second position in which it engages and lifts the vehicle wheel.

24. The tow truck of claim 23, said member having a surface inclined at approximately the angle of a tangent to the engaged vehicle wheel, and said member moving means causing said member to move in a substantially horizontal plane.

25. The tow truck of claim 24, wherein said support means comprises a bar, a second wheel engaging member fixed on said bar and located forwardly of said first mentioned member.

26. The tow truck of claim 25, said second wheel engaging member having a downwardly and rearwardly inclined wheel engaging surface.

27. The tow truck of claim 22, said support means comprising a bar, an inclined surface at each end portion of said bar for engaging a lower portion of a wheel of a towed vehicle, an arm inwardly of the said inclined surface and extending transversely of said bar, a second arm movable connected to said first arm for movement from a position spaced from a wheel to be engaged to a position engaging the wheel, said second arm having an inclined surface for engaging another lower portion of the wheel, and motor means for moving said second arm.

28. The tow truck of claim 27, and means for pivotally connecting said second arm to said first arm.

29. A tow truck comprising:
    (a) an extensible boom,
    (b) a wheel grid for supporting the wheels for a towed automobile supported by said boom at the outer end thereof, and
    (c) means for supporting and moving said boom comprising:
        (i) first and second boom support means for engaging and supporting said boom at spaced locations therealong,
        (ii) means for pivotally supporting said boom support means located above said boom and said boom support means depending therefrom, and
        (iii) resilient means between and engaging said first and second boom support means for absorbing forces urging one said boom support means towards the other said boom support means.

30. The tow truck of claim 29, wherein said means for pivotally supporting said first and second boom support means comprises a shaft.

31. The tow truck of claim 29, wherein said first boom support means comprises pinion means on a substantially vertical axis, said boom journalled on said pinion means for substantially horizontal swinging movement.

32. The tow truck of claim 29, said second boom support means comprising means for engaging the bottom of said boom, and said resilient means positioned to absorb downward forces on said second boom support means.

33. The tow truck of claim 32, wherein said resilient means engages substantially vertical surfaces of said first and second boom support means.

* * * * *